United States Patent
Niitsuma et al.

(10) Patent No.: US 7,971,932 B2
(45) Date of Patent: Jul. 5, 2011

(54) VEHICLE SEAT

(75) Inventors: Kenichi Niitsuma, Shioya-gun (JP);
Takeshi Akutsu, Shioya-gun (JP);
Masanari Yasuda, Shioya-gun (JP)

(73) Assignee: TS Tech Co., Ltd., Asaka (JP)

( * ) Notice: Subject to any disclaimer, the term of this patent is extended or adjusted under 35 U.S.C. 154(b) by 218 days.

(21) Appl. No.: 12/068,921

(22) Filed: Feb. 13, 2008

(65) Prior Publication Data
US 2008/0203786 A1 Aug. 28, 2008

(30) Foreign Application Priority Data

Feb. 19, 2007 (JP) ................................. 2007-038106

(51) Int. Cl.
*B60N 2/42* (2006.01)
*B60R 21/00* (2006.01)
(52) U.S. Cl. .............................. 297/216.14; 297/216.13
(58) Field of Classification Search ............. 297/216.13, 297/216.14, 291–293, 374
See application file for complete search history.

(56) References Cited

U.S. PATENT DOCUMENTS

| 5,676,421 | A | * | 10/1997 | Brodsky | 297/216.13 |
|---|---|---|---|---|---|
| 6,164,720 | A | * | 12/2000 | Haglund | 297/216.1 |
| 6,296,306 | B1 | * | 10/2001 | Specht et al. | 297/216.14 |
| 6,354,659 | B1 | * | 3/2002 | Andersson et al. | 297/216.14 |
| 6,601,915 | B2 | * | 8/2003 | Sullivan et al. | 297/216.1 |
| 6,705,677 | B2 | * | 3/2004 | Oshima et al. | 297/300.2 |
| 6,767,054 | B2 | * | 7/2004 | Håland et al. | 297/216.13 |
| 7,066,308 | B2 | * | 6/2006 | Kanno et al. | 188/290 |
| 7,222,916 | B2 | * | 5/2007 | De Wilde et al. | 297/216.14 |
| 2002/0109386 | A1 | * | 8/2002 | Kojima et al. | 297/354.12 |

FOREIGN PATENT DOCUMENTS

| JP | A 08-253063 | | 10/1996 |
|---|---|---|---|
| JP | 10246267 A | * | 2/1997 |
| JP | A 10-276850 | | 10/1998 |
| JP | 10299809 A | * | 11/1998 |
| JP | 2005118313 A | * | 5/2005 |
| JP | A 2005-211402 | | 8/2005 |
| WO | WO 2004/017797 A1 | | 3/2004 |

* cited by examiner

*Primary Examiner* — David Dunn
*Assistant Examiner* — Tania Abraham
(74) *Attorney, Agent, or Firm* — Oliff & Berridge, PLC

(57) ABSTRACT

A vehicle seat 1 includes a seat back 3, a seat unit 2 for supporting the seat back 3, and a rotary damper 5 for interconnecting the seat back 3 and the seat unit 2, and for tilting the seat back 3 backward while absorbing energy generated by a load when the load is applied to the seat back 3 backward, the load having a predetermined strength or more.

2 Claims, 5 Drawing Sheets

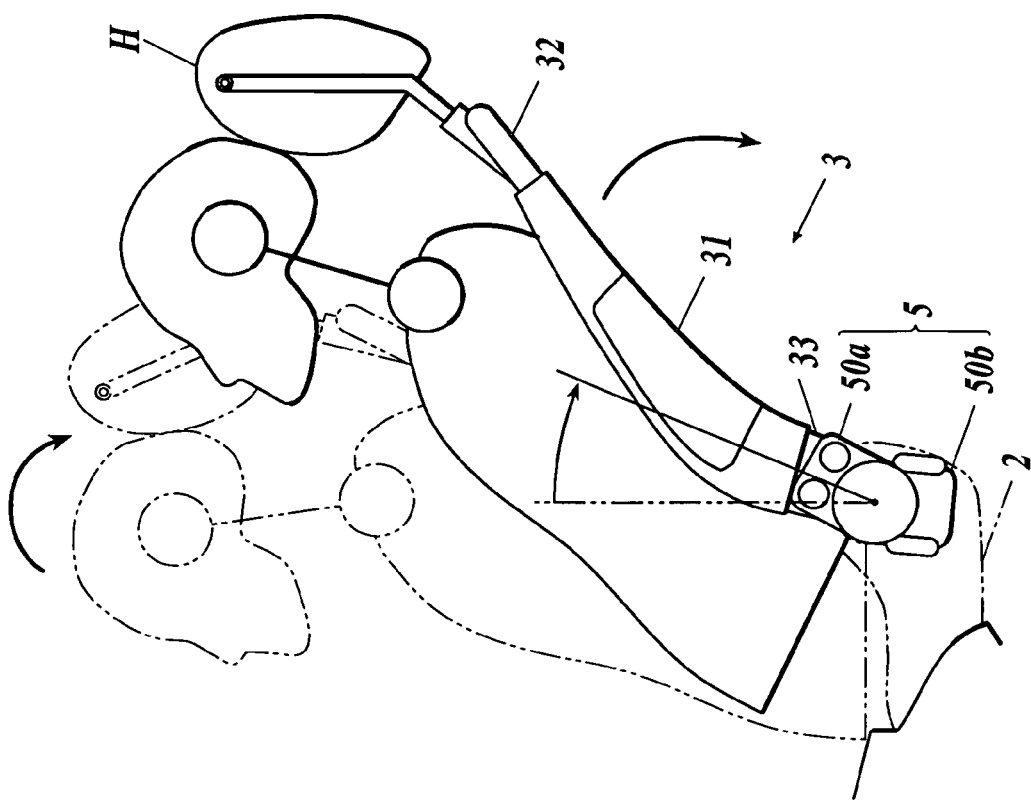
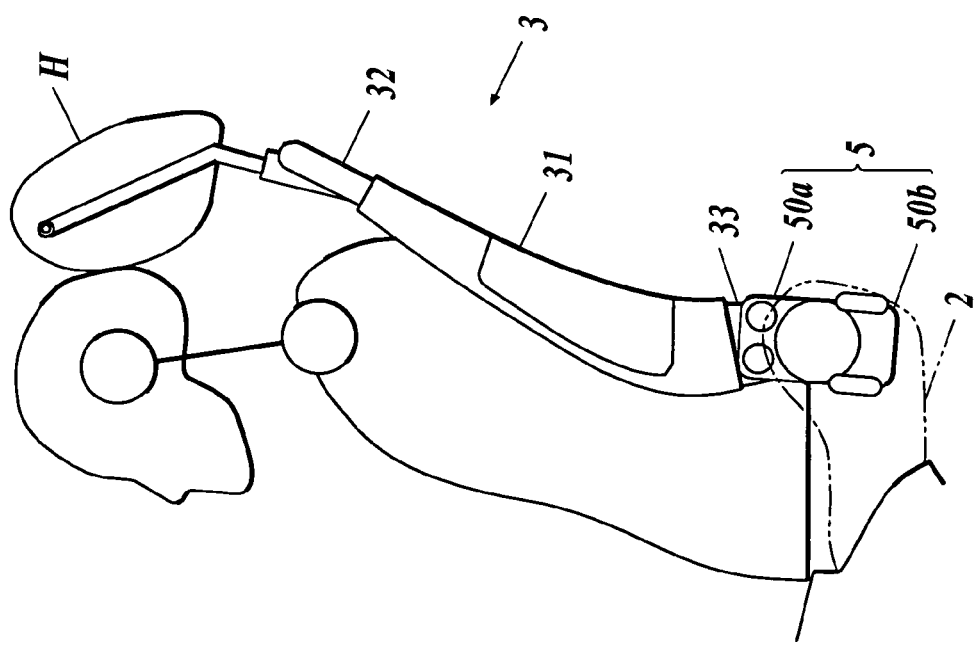

US 7,971,932 B2

VEHICLE SEAT

BACKGROUND OF THE INVENTION

1. Field of the Invention

The present invention relates to a vehicle seat which protects a head region and a neck region of an occupant at the rear collision.

2. Description of Related Art

Conventionally, when so-called rear collision such as collision during the backing of an automobile or the bumping into the rear region of an automobile occurs, a head region of a seated occupant may suddenly tilt backward due to an inertial movement, and there is some possibility that a neck region receives the impact.

Recently, therefore, various techniques for safely protecting a head region and a neck region of an occupant from the impact at the rear collision have been applied to a vehicle seat of an automobile and the like. One of such techniques is to reduce the impact on the occupant at the collision (e.g., Japanese Patent Application Laid-Open No. 2005-211402).

However, the higher efficiency of reducing the impact is, the more preferable the technique is. Therefore, automobile users desire more efficient absorption of energy at the rear collision to reduce the impact.

SUMMARY OF THE INVENTION

It is an object of the present invention to provide a vehicle seat which can absorb energy at the rear collision more efficiently than the conventional case.

To achieve the object, according to an first aspect of the present invention, a vehicle seat comprises: a seat back; a support member for supporting the seat back; and a buffer connection unit for interconnecting the seat back and the support member and for tilting the seat back backward while absorbing energy generated by a load when the load is applied to the seat back backward, the load having a predetermined strength or more.

According to the vehicle seat, the buffer connection unit interconnects the seat back and the support member for supporting the seat back, and when a load having a predetermined strength or more is applied to the seat back backward, the seat back is tilted backward while absorbing the energy generated by the load. Therefore, when the load having a predetermined strength or more is applied from the occupant to the seat back due to rear collision of a vehicle, the entire seat back is tilted backward while the energy is absorbed. Thus, as compared with the conventional case, energy generated by rear collision can be absorbed more efficiently to reduce the impact. As a result, the impact on a neck region of the occupant can be reduced to protect the occupant more safely.

In the vehicle seat of the invention, preferably, the support member is a seat unit.

Preferably, the vehicle seat further comprises a reclining mechanism unit for tiling the seat back backward based on an occupant's operation, wherein the buffer connection unit is connected to the seat back via the reclining mechanism unit.

In the vehicle seat of the invention, preferably, the support member is a reclining mechanism unit for tilting the seat back backward based on an occupant's operation.

In the vehicle seat of the invention, preferably, the buffer connection unit is a rotary damper.

BRIEF DESCRIPTION OF THE DRAWINGS

The present invention will become more fully understood from the detailed description given hereinafter and the accompanying drawing given by way of illustration only, and thus are not intended as a definition of the limits of the present invention, and wherein:

FIGS. 5A and 5B are side diagrams conceptually illustrating states of the vehicle seat before and after rear collision.

PREFERRED EMBODIMENT OF THE INVENTION

The preferred embodiment of a vehicle seat according to the present invention will be described below referring to the accompanying drawings. Although in the embodiment, various preferable technical limitations to carry out the present invention are added, a scope of the invention is not limited to the embodiment or illustrated examples.

Figure 1:
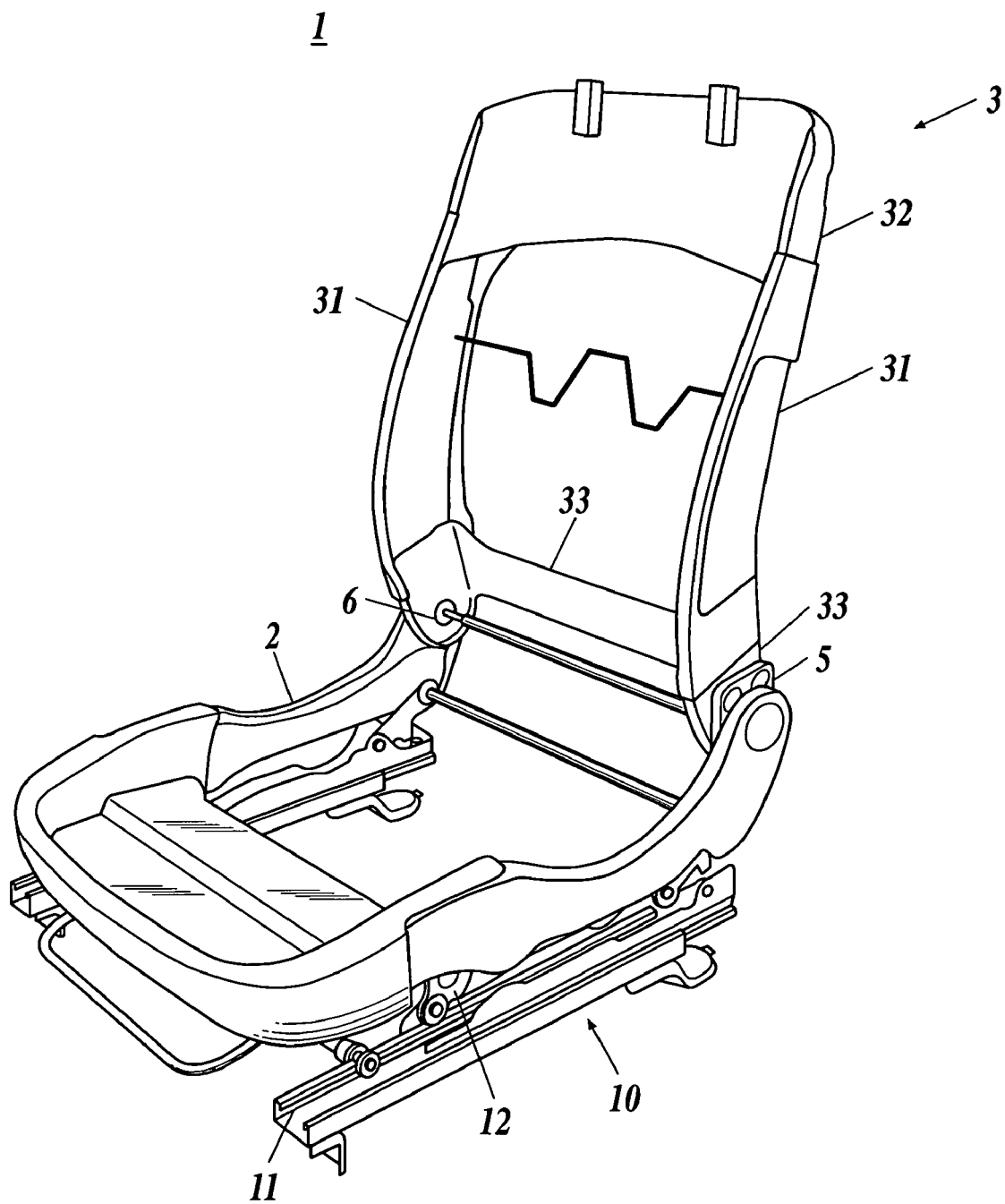
FIG. 1 is a perspective diagram illustrating a schematic configuration of a vehicle seat according to the present invention.

FIG. 1 is a perspective diagram illustrating a schematic configuration of a vehicle seat 1 according to the present invention.

As shown in this figure, the vehicle seat 1 includes a seat unit 2 on a base frame 10 connected to a floor of a vehicle (not shown).

The base frame 10 includes a position adjustment mechanism unit 11 to adjust a position of the seat unit 2 in a back-and-forth direction, and a height adjustment mechanism unit 12 to adjust a height of the seat unit. For the position adjustment mechanism unit 11 and the height adjustment mechanism unit 12, conventionally known mechanism units can be used.

The seat unit 2 is a frame body formed into a substantially rectangular shape in the planar view, and is covered with such as a cushion (not shown) to support a hip of an occupant from the lower side.

A seat back 3 is connected to a rear end part of the seat unit 2 via a reclining mechanism unit 6.

The seat back 3 is covered with such as a cushion (not shown) to support a back of the occupant from the back side. The seat back 3 is a frame body formed into a substantially rectangular shape in a front view according to the embodiment. More specifically, the seat back 3 includes two side frames 31 arranged away from each other in left and right directions and extending up and down, and an upper frame 32 and a lower frame 33 which extend left and right and connect upper ends and lower ends of the two side frames 31 respectively with each other. A head rest H is disposed in an upper end of the seat back 3 although it is not shown in FIG. 1 (see FIGS. 5A and 5B). This head rest H may be disposed integrally with the seat back 3 or in a state where it can move up and down with respect to the seat back 3.

The reclining mechanism unit 6 is fixed to the seat unit 2 to support the seat back 3 from the lower side, and is configured to tilt the seat back 3 backward based on the occupant's operation.

Figure 2:
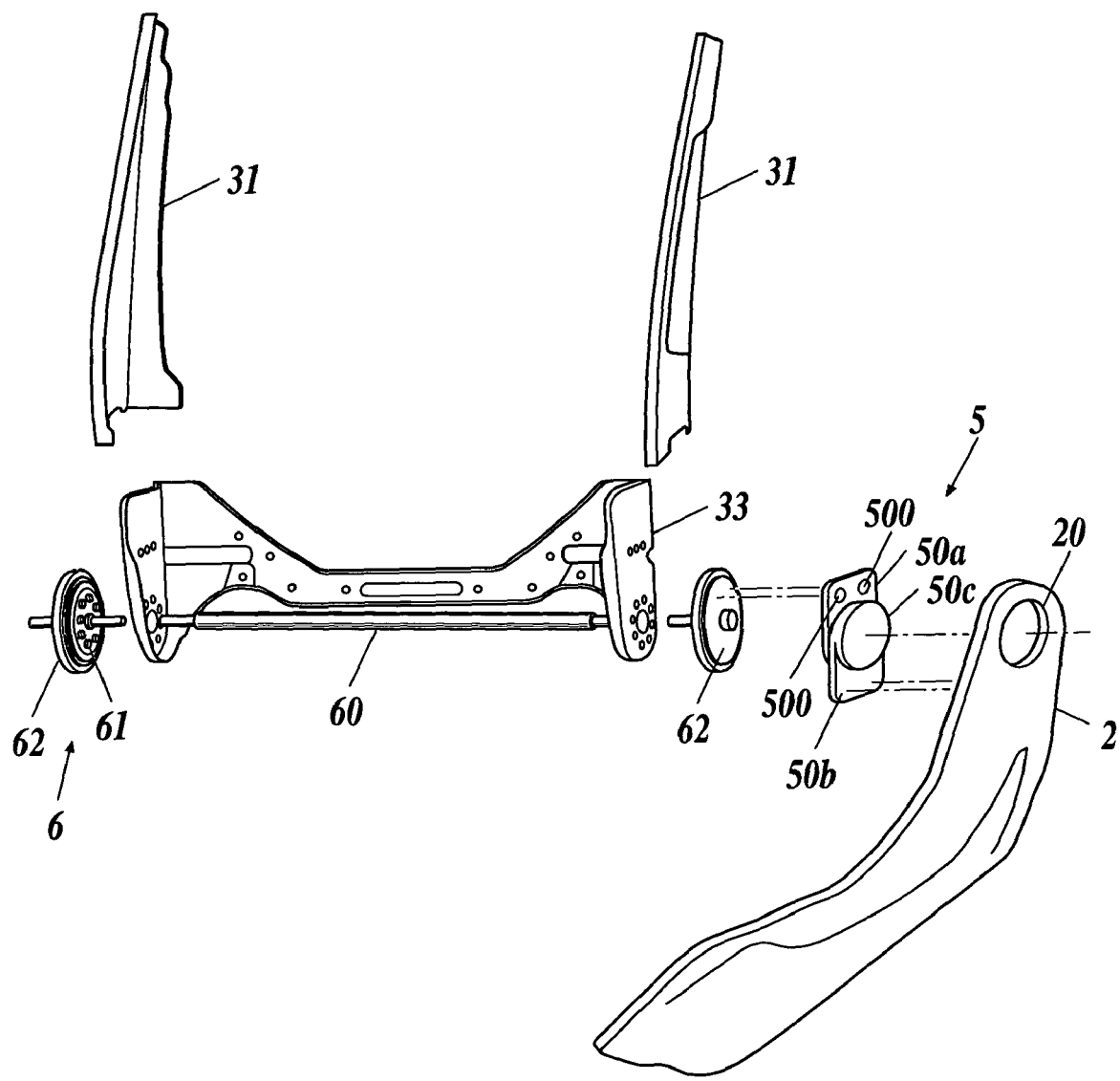
FIG. 2 is an exploded perspective diagram illustrating a schematic configuration of the vehicle seat according to the present invention.

More specifically, as shown in FIG. 2, the reclining mechanism unit 6 is a so-called round recliner, and includes two rotary rings 61 interconnected via a cylindrical pivotal shaft 60, and fixed rings 62 to rotatably support the rotary rings 61.

The rotary rings 61 are fixed to the side frames 31 of the seat back 3, and the fixed rings 62 are fixed to the seat unit 2. Thereby, the seat back 3 is rotated relatively to the seat unit 2. The reclining mechanism unit 6 includes a handle (not shown) to adjust an angle of the seat back 3. For the reclining mechanism unit 6, a conventionally known mechanism unit disclosed in such as Japanese Patent Application Laid-Open No. Hei 10-276850, Japanese Patent Application Laid-Open No. Hei 8-253063, or WO 2004/017797 A1 can be used.

Figure 3:
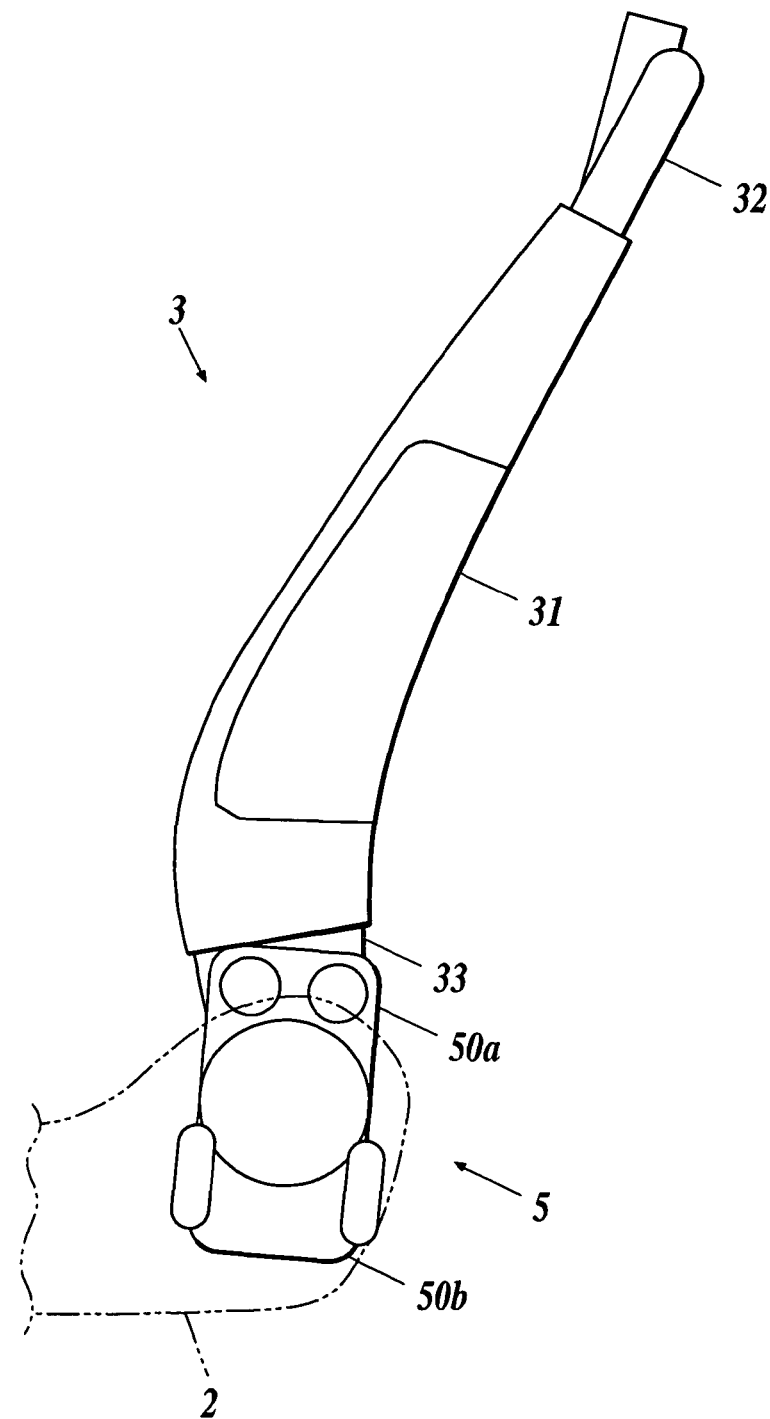
FIG. 3 is a diagram illustrating a state where a reclining mechanism unit and a low frame are interconnected through a rotary damper.

As shown in FIGS. 2 and 3, a rotary damper 5 is arranged between the reclining mechanism unit 6 and the seat unit 2 to connect the reclining mechanism unit 6 and the seat unit 2 with each other.

Figure 4:
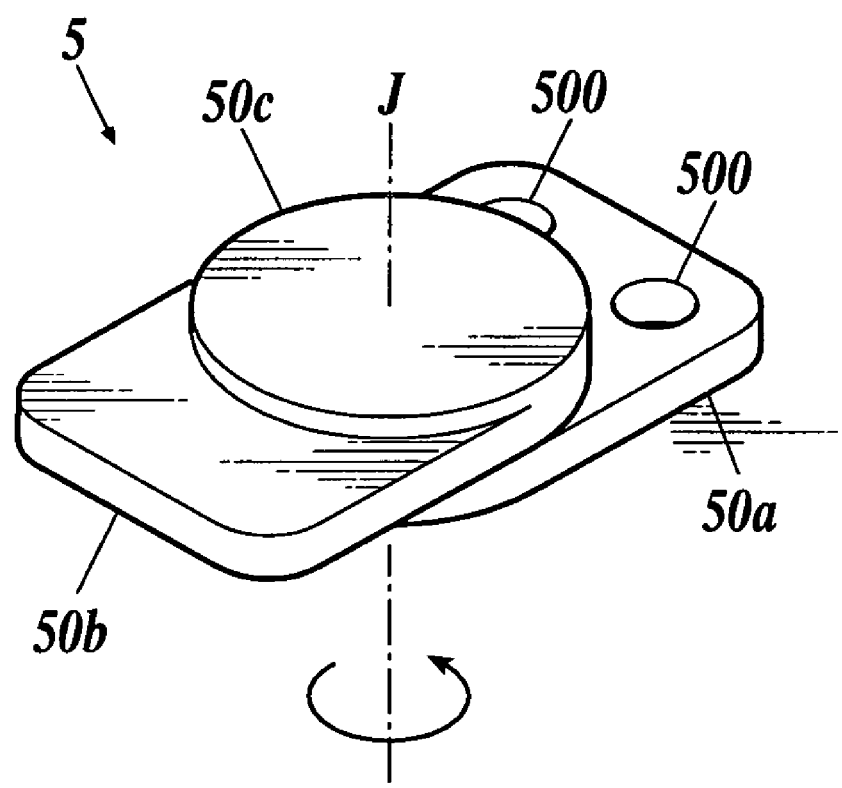
FIG. 4 is a perspective diagram illustrating the rotary damper.

As shown in FIG. 4, the rotary damper 5 includes two rotary members 50a and 50b which are linearly connected.

When moment loads having a predetermined strength or more (loads of 1500 N/m or more according to the embodiment) are received oppositely to each other in a circumferential direction around a rotary axis J, the rotary members 50a and 50b rotate by 5 to 20° relatively to each other while absorbing the loads.

As shown in FIG. 2, the rotary member 50a is welded to the fixed ring 62 of the reclining mechanism unit 6 via two through-holes 500. The rotary member 50b is fillet-welded to the seat unit 2 at two positions of an end of an opposite side to the rotary member 50a. For welding methods thereof, a well-known method such as carbon dioxide gas arc welding or inert gas arc welding (MIG welding) can be used.

According to the embodiment, a cylindrical part 50c of the rotary member 50b is inserted into a through-hole 20 of the seat unit 2. However, the cylindrical part 50c may be disposed in a recess formed in the seat unit 2. For the rotary damper 5 described above, a conventionally known damper can be used.

Next, an operation of the vehicle seat 1 at the rear collision of a vehicle will be described.

First, when rear collision occurs in the vehicle in a state of FIG. 5A, and a moment load having 1500 N/m or more is applied to the seat back 3 from the occupant, the load is transmitted from the seat back 3 to the reclining mechanism unit 6 and the rotary member 50a of the rotary damper 5 in this order.

In this case, as shown in FIG. 5B, the rotary member 50a rotates relatively to the rotary member 50b while absorbing impact energy caused by the load to tilt the reclining mechanism unit 6 and the seat back 3 by 5 to 20° backward. Accordingly, when a load having 1500 N/m or more is applied from the occupant to the seat back 3 due to rear collision of the vehicle, the entire seat back 3 is tilted backward while the impact energy is absorbed. Thereby, the impact on the neck region of the occupant is reduced.

According to the vehicle seat 1 described above, when a load having 1500 N/m or more is applied from the occupant to the seat back 3 due to rear collision of the vehicle or the like, the entire seat back 3 is tilted backward while the impact energy is absorbed. Thus, as compared with the conventional case, the impact energy generated at the rear collision can be absorbed more efficiently to reduce the impact. As a result, the impact on the neck region of the occupant can be reduced to protect the occupant more safely.

Because the impact on the neck region is reduced by the rotary damper 5, for example, time and labor of replacing components after rear collision can be omitted unlike a case of reducing the impact by a plastic-deformed member.

Because the tilt angle of the seat back 3 is 5 to 20°, an occupant of a backseat can be safely protected.

The embodiment to which the present invention can be applied is not limited to the above embodiment. The embodiment can be modified without departing from the gist of the invention as occasion demands.

For example, according to the embodiment, the rotary damper 5 interconnects the reclining mechanism unit 6 and the seat unit 2. However, the rotary damper 5 may connect the lower frame 33 of the seat back 3 with the reclining mechanism unit 6 as a support member according to the present invention.

A buffer connection unit of the present invention has been described as the rotary damper 5. However, other buffer members such as a rod-like extensible damper may be used as long as they can connect the reclining mechanism unit 6 with the seat back 3 or the seat unit 2, and when a load having a predetermined strength or more is applied to the seat back 3 backward, the seat back 3 is tilted backward while absorbing the load.

It has been described that the rotary member 50b of the rotary damper 5 is fillet-welded to the seat unit 2 at the two positions of the end of the opposite side to the rotary member 50a. However, the rotary member 50b may be fixed via a through-hole by arc spot welding.

The entire disclosure of a Japanese Patent Application No. 2007-38106, filed on Feb. 19, 2007, including specifications, claims, drawings and summaries are incorporated herein by reference in their entirety.

What is claimed is:

1. A vehicle seat comprising:
   a seat back;
   a support member for supporting the seat back;
   a rotary damper for interconnecting the seat back and the support member and for tilting the seat back backward while absorbing energy generated by a load when the load is applied to the seat back backward, the load having a predetermined strength or more;
   wherein the support member comprises a seat unit and a reclining mechanism unit for tilting the seat back backward based on an occupant's operation, and the rotary damper is provided so as to be sandwiched between the seat unit and the reclining mechanism unit;
   the rotary damper comprises two rotary members, one of the rotary members being connected to the reclining mechanism unit, the other of the rotary members being connected to the seat unit, and the two rotary members rotate relative to each other around a one rotary axis of the two rotary members when the load is applied to the seat back backward, and
   the two rotary members overlap in a direction of the one rotary axis,
   wherein the two rotary members rotate around only the one rotary axis of the two rotary members while the load is applied to the seat back backward.

2. The vehicle seat of claim 1,
   wherein the rotary damper is connected to the seat back via the reclining mechanism unit.

* * * * *